US006160852A

United States Patent [19]
Grube et al.

[11] Patent Number: 6,160,852
[45] Date of Patent: Dec. 12, 2000

[54] METHOD AND APPARATUS FOR PROVIDING WIDE-BAND AND NARROW-BAND COMMUNICATIONS

[75] Inventors: Gary W. Grube, Barrington; Bradley M. Hiben, Glen Ellyn, both of Ill.

[73] Assignee: Motorola, Inc., Schaumburg, Ill.

[21] Appl. No.: 09/022,929

[22] Filed: Feb. 12, 1998

[51] Int. Cl.$^7$ ................................................ H04L 27/00
[52] U.S. Cl. ............................................ 375/256; 455/509
[58] Field of Search .................................. 375/256, 219, 375/220, 259, 260, 377; 370/316, 343, 386, 357, 360, 389, 420; 455/68, 510, 69, 70, 5.1, 5.6, 509, 512, 517

[56] References Cited

U.S. PATENT DOCUMENTS 4,257,119  3/1981  Pitroda .
4,700,327  10/1987  Hilton .
5,878,037  3/1999  Sherman ................................. 370/335
5,914,942  6/1999  Hassan et al. ......................... 370/316

*Primary Examiner*—Tesfaldet Bocure
*Assistant Examiner*—Jean Corrielus
*Attorney, Agent, or Firm*—Steven R. Santema

[57] ABSTRACT

A method and apparatus for integrated processing of narrow-band communications and wide-band communications is generally accomplished when a communications controller (25) receives a request for a narrow-band communication. The request includes identity of at least one targeted communication device (32). Having received the request, the communications controller determines whether the at least one targeted communication device is participating in a wide-band communication on a wide-band channel. If so, the communications controller causes a narrow-band communication to be mixed with the wide-band communication. The mixed signal is then provided to the at least one targeted communication device on the wide-band channel.

6 Claims, 4 Drawing Sheets

METHOD AND APPARATUS FOR PROVIDING WIDE-BAND AND NARROW-BAND COMMUNICATIONS

TECHNICAL FIELD OF THE INVENTION

The present invention relates generally to wireless communication systems and more particularly to narrow-band and wide-band communication systems.

BACKGROUND OF THE INVENTION

Communication systems are known to include a plurality of communication devices and supporting infrastructure. The communication devices include mobile radios, portable radios, cellular telephones, personal computers with wireless modems and/or personal digital assistants. A communication device may request service from the wireless infrastructure by transmitting an inbound signaling word ("ISW"). The inbound signaling word is received by the wireless infrastructure, which includes base stations, base station controllers and/or mobile switching centers, and processes the request. If the communication system is capable of supporting the request, and communication resources are available, the wireless infrastructure grants the request. When granted, the wireless infrastructure transmits an outbound signaling word ("OSW") to the requesting communication device informing the device that the request has been granted and which communication resources have been allocated to support the request. In addition, the wireless infrastructure transmits an outbound signaling word to other communication devices that were targeted as participants in the request.

The communication device may request voice services and/or data services. If the communication device is affiliated with a digital communication system, the digital communication system can process both voice and data requests. If, however, the communication device is affiliated with an analog wireless communication system, the analog system processes the voice requests while a separate data system processes the data requests. To provide seamless operation to the user, the controllers of the analog system interface with the data system. Alternatively, a voice system may dedicate a particular communication resource for data only communications. While the integration of voice and data systems and digital systems provide data and voice services for communication devices, the services provided generally are considered narrow-band services.

Narrow-band services are those that are processed on communication resources that have a limited amount of bandwidth. For example, a system in accordance with the APCO (Association of Public Safety Communication Officers) Project 25 standard utilizes 12.5 kHz channel spacing wherein each channel can process 9.6 kilobits per second of data. A system in accordance with the Global System for Mobile Communications (GSM) standard, on the other hand, provides wider band services and channels having a 200 kHz channel spacing wherein each channel can support 270.833 kilobits per second of data. As such, communication devices that operate on wider-band systems do not participate in communications that occur on narrow-band systems, except that the communication devices may establish a one-to-one communication with other type devices. Thus, wide band communication devices do not participate in group, and other types of, communications with narrow band communication devices.

In addition to the lack of interoperability between wide-band communication systems and narrow-band communication systems, the federal communications commission has recently allocated UHF television channels 60 to 69 for public safety use. A portion of these new channels will include wide-band channels to facilitate modulation and techniques to enable higher bit rates for communications requiring higher speeds and more capacity.

Therefore, a need exists for a method and apparatus for integrated processing of narrow-band and wide-band communications.

DESCRIPTION OF A PREFERRED EMBODIMENT

Generally, the present invention provides a method and apparatus for integrated processing of narrow-band communications and wide-band communications. This is generally accomplished when a communications controller receives a request for a narrow-band communication. The request includes identity of at least one targeted communication device. Having received the request, the communications controller determines whether the at least one targeted communication device is participating in a wide-band communication on a wide-band channel. If so, the communications controller causes a narrow-band communication to be mixed with the wide-band communication. The mixed signal is then provided to the at least one targeted communication device on the wide-band channel. As such, communication devices that are designed to operate in a wide-band communication system are able to participate in narrow-band communications while simultaneously participating in a wide-band communication. By integrating wide-band and narrow-band communications, existing narrow-band communication systems do not have to be discarded in favor of enhanced wide-band services.

Figure 1:
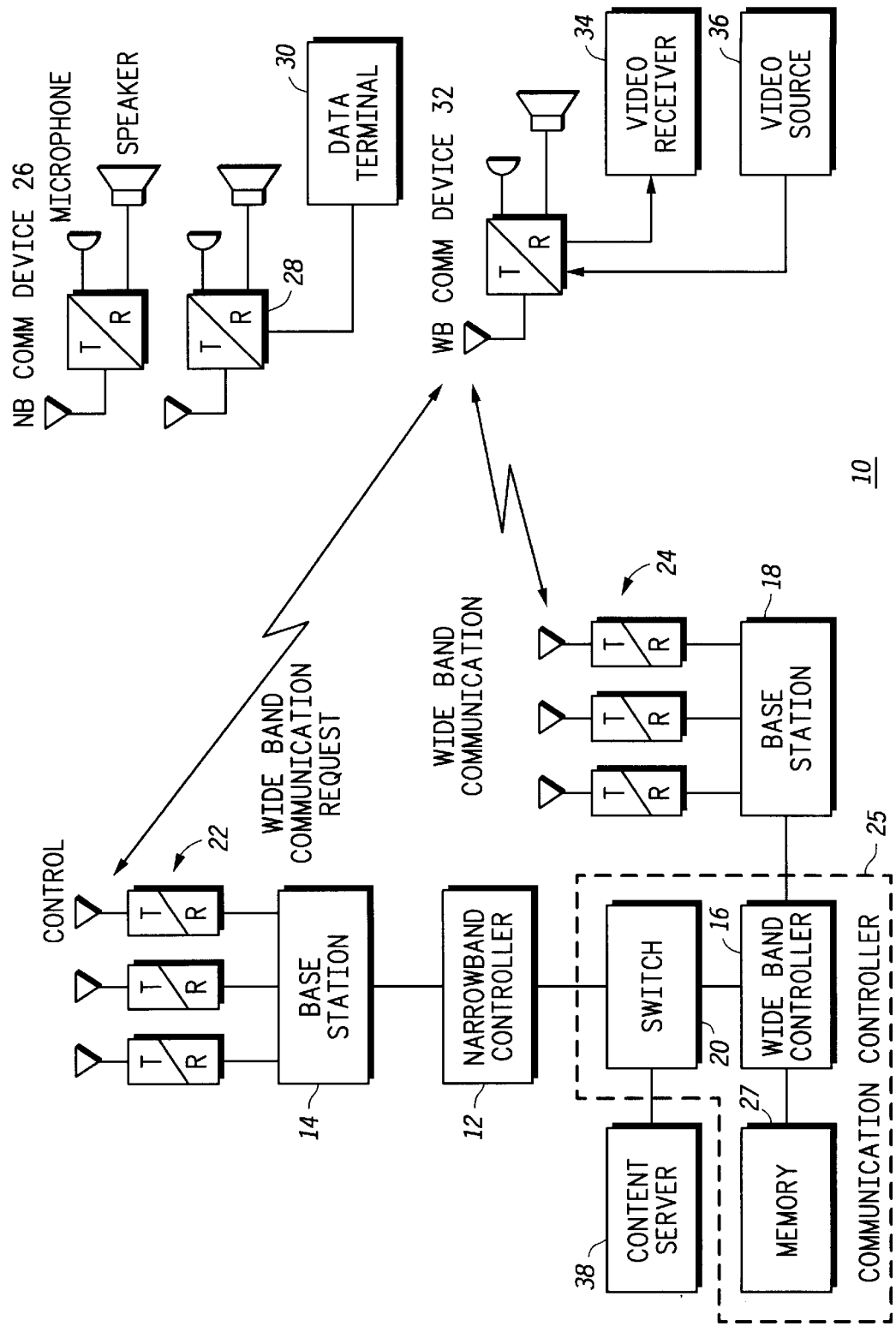
FIG. 1 illustrates a schematic block diagram of a communication system in accordance with the present invention.

The present invention can be more fully described with reference to FIGS. 1 through 5. FIG. 1 illustrates a schematic block diagram of a communication system 10 that includes a narrow-band controller 12, a narrow-band base station 14, a communications controller 25, a wide-band base station 18, a plurality of narrow-band communication devices 26 and 28, a plurality of wide-band communication devices 32, and a content server 38. The communications controller 25 includes a wide-band controller 16, a switch 20, and memory 27. The narrow-band controller 12 and the narrow-band base station 14 may be wireless infrastructure equipment as included in Motorola's iDEN™ digital communication system or Motorola's SmartZone™ communication system. Similarly, the narrow-band communication devices 26 and 28 maybe communication devices that operate on a narrow-band communication system such as Motorola's iDEN™ or Motorola's SmartZone™ communication system.

The narrow-band communication device 26 transceives information with the narrow-band controller via base station 14 and communication resources 22. The narrow-band communication device 26 includes a microphone and speaker. As such, communication device 26 is equipped to transmit audible information only. Communication device 28 includes a microphone, a speaker, and a data terminal 30. The data terminal allows the communication device 28 to transceive text data with the narrow-band controller 12 as well as audible information.

The wide-band communication device 32 includes a microphone, a speaker, a video receiver 34, and a video source 36. As is generally known, transmission of video data requires significantly more bandwidth than the transmission of text or audible data. As such, video services are not readily available on a narrow-band communication system but are on a wide-band communication system. (Note that if a plurality of narrow-band communication resources is dedicated to a single video transmission, video services are available on narrow-band communication systems. But, because several communications resources are needed for a single communication, such systems do not offer video services.) The video receiver 34 may be a television monitor, computer screen, videocassette recorder and/or any other device that can store and/or display video information. The video source 36 may be a video camera, a video recorder, and/or other video transmission device. The wide-band communication device 32 communicates with the wide-band controller 18 via wide-band base station 18 and wide-band communication resources 24. Such wide band communication resources may be in the newly allocated UHF television channel 60–69 range, or other frequency range that provides higher bandwidth than a narrow-band system.

The wide-band communication device may request a wide-band communication by transmitting a request (ISW) to the control channel of the narrow-band portion of the communication system. The wide-band request is routed to the narrow-band controller 12, which in turn routes the request to the wide-band controller 16 via switch 20. The wide-band controller processes the request and provides a response (OSW) via the wide-band communication resources 24. The wide-band communication may be a request for obtaining broadcast content information from a content server 38. Such broadcast content information may range from stored video, still images (e.g., mug shots, fingerprints, etc.) or the like.

If, while a wide-band communication device 32 is receiving a wide-band communication, it is identified as a target for a narrow-band communication, the narrow-band controller and wide-band controller inter-operate to integrate the wide-band and narrow-band communications. The details of this will be described with reference to FIGS. 2 through 5. Note that the wide-band controller and narrow-band controller may be stand-alone computing devices that include the software to process narrow-band and wide-band requests, and software to integrate the processing of such requests. The programming instructions to integrate the requests will be described below with reference to FIGS. 4 and 5. Further note that the narrow-band communications system may be a frequency division multiple access (FDMA) system while the wide-band communication system may be a GSM system. Alternatively, the narrow-band system may be an FDMA system, time division multiple access (TDMA) system, GSM system, while the wide-band system includes the newly allocated UHF television channels 60–69.

Figure 2:
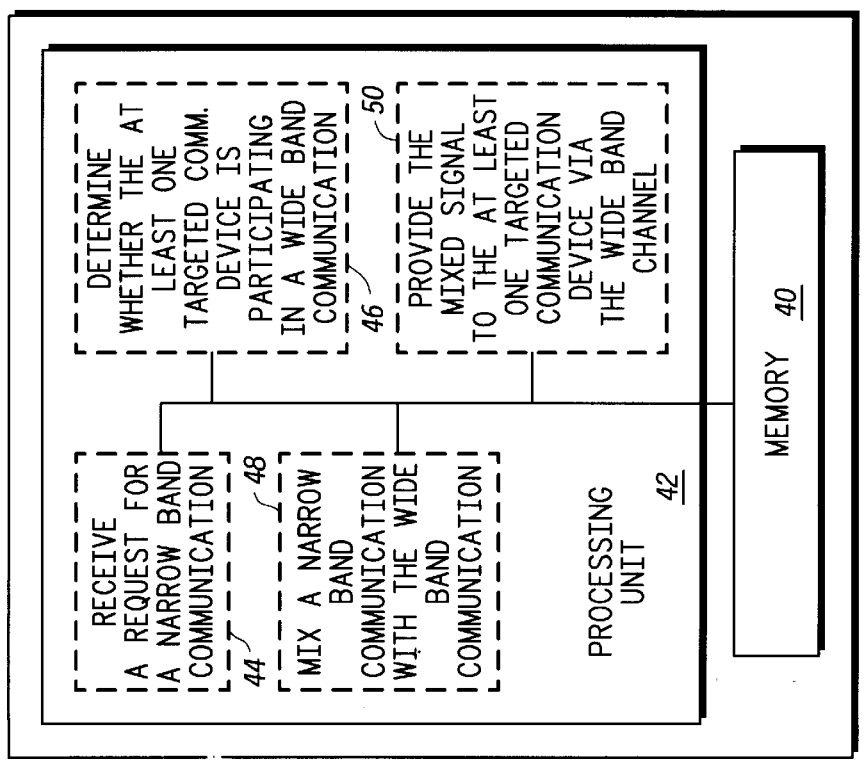
FIG. 2 illustrates a schematic block diagram of a communications controller in accordance with the present invention.

FIG. 2 illustrates a schematic block diagram of a communications controller 25. The communications controller 25 includes a processing unit 42 and memory 40. The processing unit 42 may be a microprocessor, microcomputer, microcontroller, digital signal processor, central processing unit, and/or any other device that manipulates digital information based on programming instructions. The memory 40 may be read-only memory, random access memory, reprogrammable memory, floppy disk memory, hard disk memory, magnetic tape memory, DVD ROM memory, CD ROM memory, and/or any other device that stores digital information.

Memory 40 stores programming instructions that, when read by the processing unit 42, causes the processing unit 42 to function as a plurality of circuits 44–50. While reading the programming instructions, the processing unit 42 functions as circuit 44 to receive a request for a narrow-band communication. The processing unit then reads additional programming instructions that cause it to function as circuit 46 to determine whether the at least one targeted communication device, which was identified in the request, is participating in a wide-band communication. The processing unit 42 then reads programming instructions that cause it to function as circuit 48 to mix a narrow-band communication with the wide-band communication when the targeted communication device is participating in a wide-band communication. The processing unit then functions as circuit 50 to provide the mixed signal to the at least one targeted communication device via the wide-band communication channel. The programming instructions stored in memory and the processing thereof by processing unit 42 will be discussed in greater detail with reference to FIG. 4.

Figure 3:
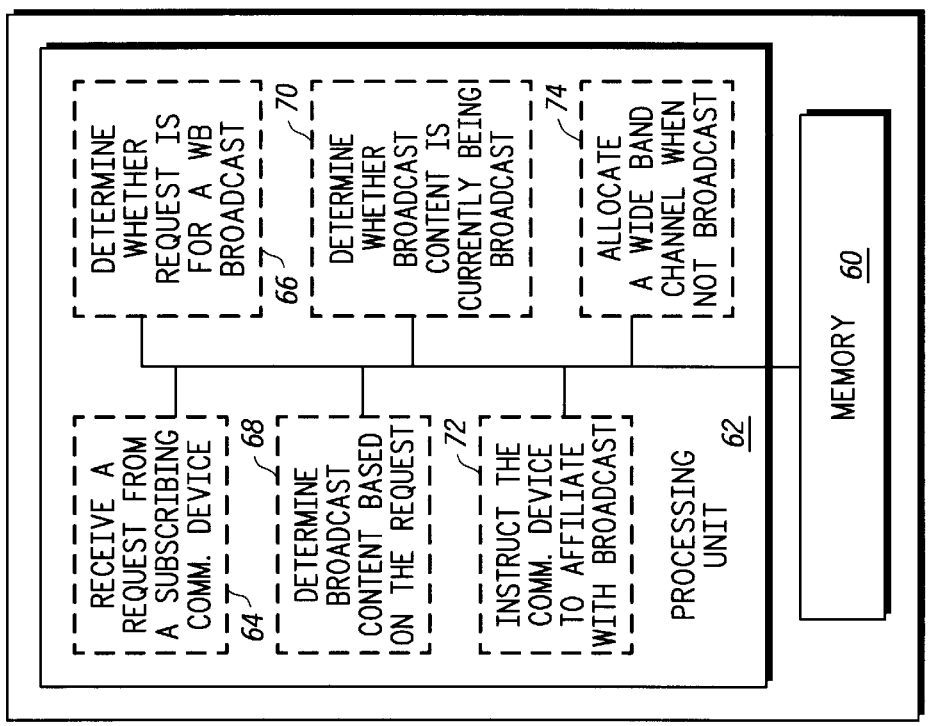
FIG. 3 illustrates an alternate schematic block diagram of a communications controller in accordance with the present invention.

FIG. 3 illustrates an alternate schematic block diagram of a communications controller 25 that includes a processing unit 62 and memory 60. The processing unit 62 may be a microprocessor, microcomputer, microcontroller, digital signal processor, central processing unit, and/or any other device that manipulates digital information based on programming instructions. The memory 60 may be read-only memory, random access memory, reprogrammable memory, floppy disk memory, hard disk memory, magnetic tape memory, DVD ROM memory, CD ROM memory, and/or any other device that stores digital information.

The memory 60 stores programming instructions that, when read by the processing unit, causes the processing unit 62 to function as a plurality of circuits 64–74. While reading the programming instructions, the processing unit 62 functions as circuit 64 to receive a request from a subscribing communication device. The processing unit then reads programming instructions that cause it to function as circuit 66 to determine whether the request is for a wide-band broadcast. The processing unit then functions as circuit 68 to determine broadcast content based on the requests. The processing unit then reads programming instructions that cause it to function as circuit 70 to determine whether the broadcast content is currently being broadcast. If the broadcast content is currently being broadcast, the processing unit functions as circuit 72 to instruct the communication device to affiliate with the wide-band channel supporting the broadcast content. If, however, the broadcast content is not currently being broadcast, the processing unit functions as circuit 74 to allocate a wide-band channel for the broadcasting of the broadcast content. The programming instructions stored in memory 60 and the processing thereof by the processing unit 62 will be discussed in greater detail with reference to FIG. 5.

Figure 4:
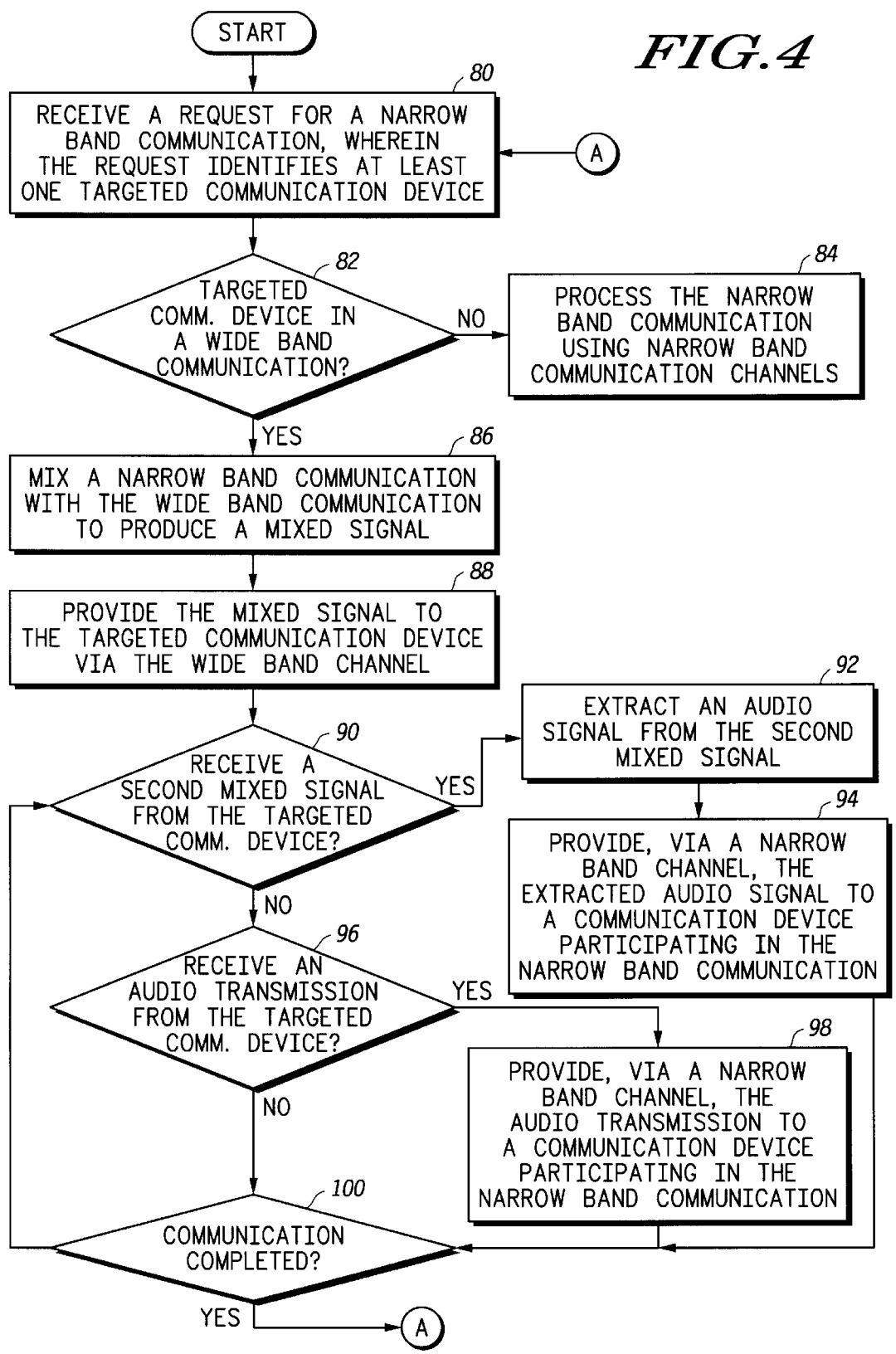
FIG. 4 illustrates a logic diagram of a method for integrated processing of wide-band and narrow-band communications in accordance with the present invention.

FIG. 4 illustrates a logic diagram of a method for integrating processing of wide-band and narrow-band communications. The process begins at step 80 where a request for narrow-band communications is received. The request identifies at least one targeted communication device. The process then proceeds to step 82 where a determination is made as to whether the targeted communication device is involved in a wide-band communication. A wide-band communication includes transceiving a broadcast of stored video data, transceiving a broadcast of live video data, and/or transceiving a broadcast of unrelated images, e.g., mug shots, finger prints. If the targeted communication device is not in a wide-band communication, the process proceeds to step 84. At step 84 the narrow-band communication is processed via a narrow-band communication channel. In other words, the narrow-band communication is processed as in existing narrow-band communication systems.

If the targeted communication device is in a wide-band communication, the process proceeds to step 86. At step 86 a narrow-band communication is mixed with the wide-band communication to produce a mixed signal. The mixing may be done based on presentation options of the targeted communication device. The presentation options may request providing both signals unaltered, mixing only the audio of the wide-band communication with the audio of the narrow-band communication to produce a mixed audio, providing only the narrow-band audio, and/or reducing volume of the wide-band audio prior to mixing with the narrow-band audio. Note that the presentation options may be stored by the communications controller and retrieved for processing the information. Alternatively, each communication device may store its own presentation options and provide them to the communications controller when a particular service has been evoked.

The process proceeds to step 88 where the mixed signal is provided to the targeted communication device via the wide-band channel. The mixed signal allows the wide-band communication device to participate in both the wide-band and narrow-band communications simultaneously. For example, if a police detective operates the wide-band communication device, the police detective may be downloading video images of mug shots while participating in a group dispatch call from its precinct. As such, advanced wide-band features can be integrated into existing narrow-band communication systems without having to discard the narrow-band communications system.

The process proceeds to step 90 where a determination is made as to whether a second mixed signal is received from the targeted communication device. The second mixed signal involves the wide-band communication device transmitting video and audio to the wide-band controller. If the targeted communication device is transmitting a second mixed signal, the process proceeds to step 92. At step 92 the audio signal of the second mixed signal is extracted. The process then proceeds to step 94 where the extracted audio signal is provided, via a narrow-band channel, to communication devices participating in the narrow-band communication. Having done this, the process proceeds to step 100.

If the targeted communication device is not transmitting a second mixed signal, the process proceeds to step 96. At step 96, a determination is made as to whether an audio transmission from the targeted communication device is received. In this instance, the wide-band communication device may be receiving wide-band information, such as still images or live video, and participating in a group communication. While participating in a group communication, the operator of the wide-band communication device has information he desires to transmit. Thus, the operator speaks into his or her wide-band communication device, which provides the communication to the wide-band controller. If the audio transmission is received, the process proceeds to step 98. At step 98, the wide-band controller interfaces with the narrow-band controller, such that the narrow-band controller can provide via a narrow-band channel the audio transmission to communication devices participating in the narrow-band communication. Having done this, the process proceeds to step 100.

At step 100, a determination is made as to whether this communication is complete. If, the communication is not complete, the process repeats at step 90. If, however, the communication is complete, the process returns to step 80 for a subsequent communication.

Figure 5:
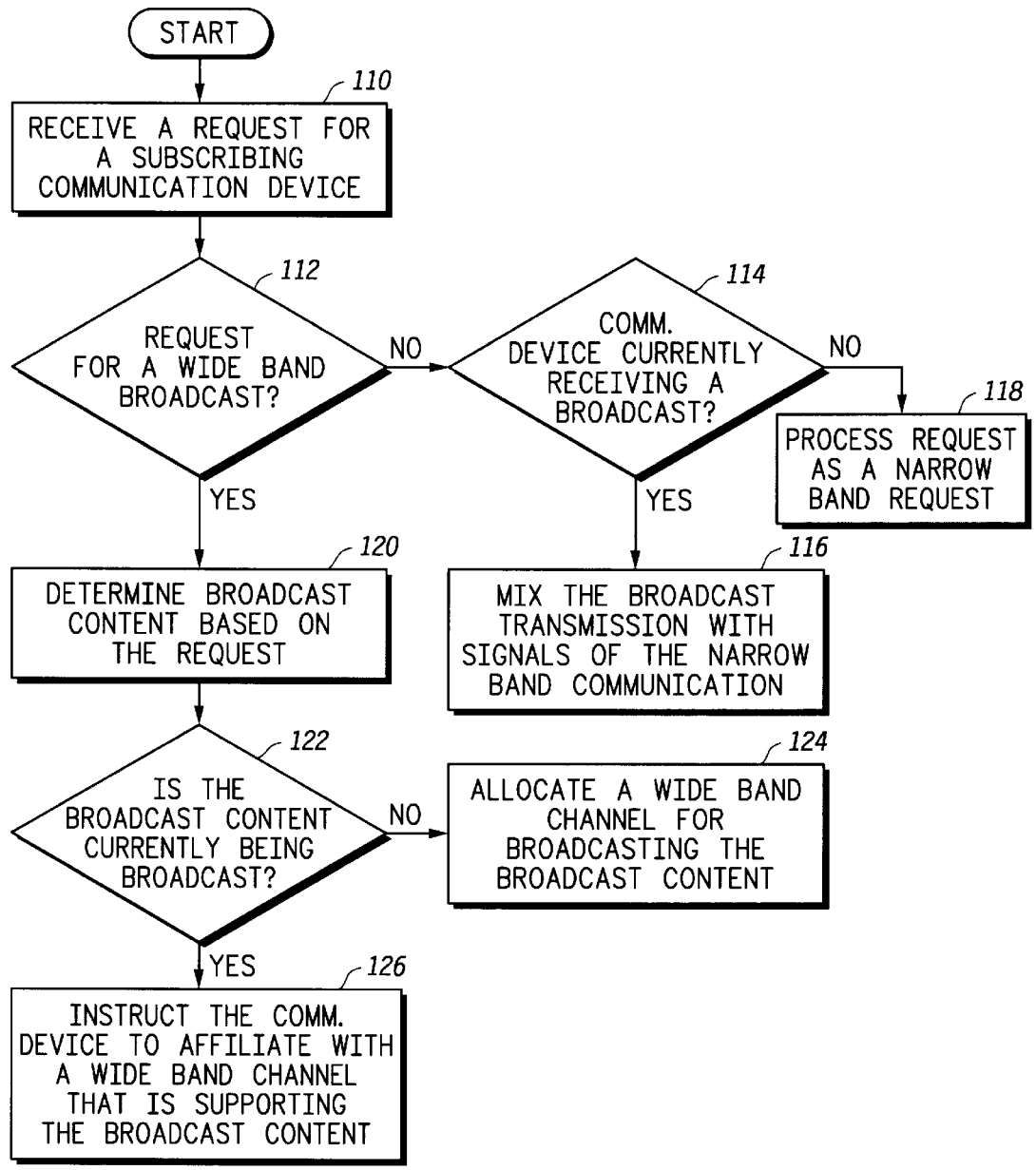
FIG. 5 illustrates a logic diagram of an alternate method for integrated processing of wide-band and narrow-band communications in accordance with the present invention.

FIG. 5 illustrates a logic diagram of an alternate method for integrated processing of wide-band and narrow-band communications. The process begins at step 110 where a request is received from a subscribing communication device. The request may identify particular broadcast content (e.g., live video, still images, etc.) that it desires to receive or the request may only include the identity of the requesting device. If the request only includes the identity of the requesting device, the communications controller determines the broadcast content based on stored information. The process then proceeds to step 112 where a determination is made as to whether the request is for a wide-band broadcast. If not, the process proceeds to step 114 where a determination is made as to whether a communication device is currently receiving a wide-band broadcast. If not, the process proceeds to step 118 where the request is processed as a narrow-band request. If, however, the communication device is receiving a broadcast, the process proceeds to step 116. At step 116, the broadcast transmission is mixed with signals of the narrow-band communication. This was discussed in greater detail with reference to FIG. 4.

If, at step 112, it was determined that the request is for a wide-band broadcast, the process proceeds to step 120. At step 120 broadcast content is determined based on the request. For example, if the request identifies the particular broadcast content, the communications controller would retrieve that particular broadcast content. Alternatively, if the request only identified the particular communication device, the communications controller would access a table to lookup the types of broadcast content this communication device has subscribed to. Once the broadcast content has been identified, the process proceeds to step 122.

At step 122 a determination is made as to whether the broadcast content is currently being broadcast on a wide-band communication resource. If not, the process proceeds to step 124 where a wide-band communication channel is allocated for the broadcasting of the broadcast content. If, however, the broadcast content is currently being broadcast, the process proceeds to step 126. At step 126, the communication device is instructed to affiliate with the wide-band channel that is supporting the broadcast content.

The preceding discussion has presented a method and if apparatus for integrating wide-band and narrow-band communications. By incorporating a communications controller, wide-band communication services can be integrated with narrow-band communication services. As such, narrow-band communication systems can be upgraded to support wide-band communication devices. Thus, as more and more public safety wide-band services become available due to the newly released communication resources in the United States of channel 60–69 in the UHF television range, existing communication systems may be upgraded to support the new services without having to be replaced.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A method for providing wide band and narrow band communications, the method comprises the steps of:
   a) receiving a request for a narrow band communication, wherein the request includes identity of at least one targeted communication device;
   b) determining whether the at least one targeted communication device is participating in a wide band communication on a wide band channel;
   c) when the at least one targeted communication device is participating in the wide band communication, mixing a narrow band communication with the wide band communication to produce a mixed signal;
   d) providing the mixed signal to the at least one targeted communication device via the wide band channel;
   e) receiving a second mixed signal from the at least one targeted communication device;
   f) extracting an audio signal from second mixed signal; and
   g) providing, via a narrow band channel, the audio signal to a communication device participating in the narrow band communication.

2. A communications controller comprising:

a processing unit; and memory operably coupled to the processing unit, wherein the memory stores programming instructions that, when read by the processing unit, cause the processing unit to function as circuits to
   (a) receive a request for a narrow band communication, wherein the request includes identity of at least one targeted communication device;
   (b) determine whether the at least one targeted communication device is participating in a wide band communication on a wide band channel;
   (c) mix a narrow band communication with the wide band communication to produce a mixed signal when the at least one targeted communication device is participating in the wide band communication; and
   (d) provide the mixed signal to the at least one targeted communication device via the wide band channel.

3. The communications controller of claim 2 further comprises, within the memory, programming instructions that cause the processing unit to function as a circuit to determine presentation options of the at least one targeted communication device and mixing the narrow band communication with the wide band communication based on the presentation options.

4. The communications controller of claim 3 further comprises, within the memory, programming instructions that cause the processing unit to function as a circuit to determine the presentation options to be at least one of: mixing audio of the wide band communication and audio of the narrow band communication to produce mixed audio, providing only the audio of the narrow band communication, and reducing volume of the audio of the wide band communication prior to mixing with the audio of the narrow band communication.

5. The communications controller of claim 2 further comprises, within the memory, programming instructions that cause the processing unit to:

receive a second mixed signal from the at least one targeted communication device;

extract an audio signal from second mixed signal; and provide, via a narrow band channel, the audio signal to a communication device participating in the narrow band communication.

6. The communications controller of claim 2 further comprises, within the memory, programming instructions that cause the processing unit to:

receive an audio transmission from the at least one targeted communication device; and provide the audio transmission to a communication device participating in the narrow band communication.

* * * * *